United States Patent
Onishi et al.

(10) Patent No.: US 7,414,519 B2
(45) Date of Patent: Aug. 19, 2008

(54) THEFT PREVENTION APPARATUS OF LEISURE VEHICLE

(75) Inventors: Yoji Onishi, Kobe (JP); Kenichi Furuhashi, Akashi (JP); Tomoyuki Takahashi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 177 days.

(21) Appl. No.: 11/335,172

(22) Filed: Jan. 18, 2006

(65) Prior Publication Data

US 2006/0163947 A1 Jul. 27, 2006

(30) Foreign Application Priority Data

Jan. 21, 2005 (JP) .............................. 2005-013581

(51) Int. Cl.
  *B60R 25/10* (2006.01)
(52) U.S. Cl. ............ 340/426.1; 340/425.5; 340/426.17; 340/426.28; 340/426.31; 340/427; 307/10.2
(58) Field of Classification Search ................. 340/426, 340/425.5, 426.31, 427, 5.1, 426.17, 426.28, 340/426.3; 70/237; 307/9.1, 10.1, 10.2
See application file for complete search history.

(56) References Cited

U.S. PATENT DOCUMENTS

| | | | | |
|---|---|---|---|---|
| 6,028,507 A | * | 2/2000 | Banks et al. ................. | 340/427 |
| 6,515,580 B1 | * | 2/2003 | Isoda et al. ............... | 340/425.5 |
| 6,734,578 B2 | * | 5/2004 | Konno et al. ................ | 307/10.2 |
| 6,759,828 B2 | * | 7/2004 | Konno ......................... | 307/9.1 |
| 2001/0029758 A1 | * | 10/2001 | Kehr ........................... | 70/252 |
| 2004/0063477 A1 | | 4/2004 | Takeshi | |

FOREIGN PATENT DOCUMENTS

| | | |
|---|---|---|
| EP | 1 184 263 A2 | 3/2002 |
| EP | 1439101 A | 7/2004 |
| EP | 1591329 A | 11/2005 |
| JP | 3112585 | 9/2000 |

* cited by examiner

*Primary Examiner*—Davetta W. Goins
(74) *Attorney, Agent, or Firm*—Alleman Hall McCoy Russell & Tuttle LLP (57) ABSTRACT

A theft prevention apparatus of a leisure vehicle including a portable device configured to transmit a user identification code by radio, a communication device that is equipped in the leisure vehicle and is configured to receive the user identification code, an electric power supply loaded in the leisure vehicle, a hand-operated switch that is disposed on a power line coupling the electric power supply to the communication device and is configured to turn to an on-state or an off-state to or not to permit the electric power to be supplied from the electric power supply to the communication device; and a controller configured to determine whether or not the user identification code received from the communication device matches the correct user identification code and to enable the leisure vehicle to be steered when it is determined that the received user identification code matches the correct user identification code.

19 Claims, 6 Drawing Sheets

THEFT PREVENTION APPARATUS OF LEISURE VEHICLE

TECHNICAL FIELD

The present invention generally relates to a theft prevention apparatus that is configured to prevent theft of leisure vehicles such as motorbikes, motorcycles, three-wheeled vehicles, three-wheeled or four-wheeled utility vehicles, and personal watercraft (PWC) which are equipped with rider's seats which are open to the outside.

BACKGROUND ART

Typically, a leisure vehicle, for example, a motorcycle is equipped with a rider's seat which is open to the outside. Thus, a rider may freely mount the rider's seat. A key switch is positioned in an exposed region near the rider's seat, for example, an instrument panel located in front of the rider's seat. For this reason, the motorcycle is more likely to be stolen in contrast to automobiles, which are equipped with a rider's seat into which a third party is unable to enter.

Under the circumstances, Japanese Patent No. 3112585 discloses a theft prevention apparatus in which an engine is able to start-up only when a key that matches a key switch is inserted into the key switch to turn on a main switch and a communication device that is equipped in a vehicle and is configured to store a predetermined user identification (ID) code matches a user ID code received from a portable device (card) carried by a rider.

In this theft prevention apparatus, the communication device equipped in the vehicle is required to be always held to await the user ID code from the portable device. In a case where the user goes outside for a long time period, for example, for a trip, and the vehicle is left unsteered for the long time period, battery power of the vehicle is wasted. This is problematic because battery capacity of a motorcycle is smaller than that of a four-wheeled vehicle.

The rider's seat of the motorcycle is open to the outside as described above, and the rider in many cases steers the motorcycle, wearing gloves while driving. To start the vehicle, the rider takes the gloves off to take the key out of a pocket, inserts the key into the key switch, and turns the key to a predetermined position. Thereafter, the rider puts back on the gloves. Such a procedure may be burdensome to the rider.

To address these circumstances, a key system (or keyless system) of a vehicle has been proposed, in which a knob of a main switch that replaces the key and the key switch is turned on, and when a rider carrying a portable device in a pocket or the like comes closer than a predetermined distance away from the vehicle the user ID code is communicated between the portable device and the communication device equipped in the vehicle to detect whether or not there is a match, and the engine is able to start-up if the match is detected.

However, in the keyless system of the motorcycle equipped with the seat which is open to the outside, if the rider (owner) carrying the communication device comes closer than the predetermined distance away from the vehicle, or otherwise the rider is checking the motorcycle from the side with someone other than the rider (owner) mounting the seat, then the user ID of the portable device code matches the user ID code of the communication device, so that someone may start-up the engine. As a result, theft of the vehicle may occur.

Furthermore, the above mentioned problems arise in leisure vehicles other than motorcycles.

SUMMARY OF THE INVENTION

The present invention addresses the above mentioned conditions, and an object of the present invention is to provide a theft prevention apparatus of a leisure vehicle in which an electric power supply (i.e., a battery equipped in a vehicle or batteries equipped in the vehicle and in a portable device carried by a rider) is not wasted. Another object of the present invention is to provide a theft prevention apparatus of a leisure vehicle that comprises a keyless system and is able to achieve a high theft prevention functionality.

According to one aspect of the present invention, there is provided a theft prevention apparatus of a leisure vehicle that is configured to enable the leisure vehicle to be steered when a user identification code transmitted by radio matches a correct user identification code, the apparatus comprising a portable device configured to transmit the user identification code by radio; a communication device that is equipped in the leisure vehicle and is configured to receive the user identification code transmitted from the portable device, with electric power being supplied to the communication device; an electric power supply, i.e., battery, mounted in the leisure vehicle; a hand-operated switch that is disposed on a power line coupling the electric power supply to the communication device and is configured to be turned to an on-state or an off-state to or not to permit the electric power to be supplied from the electric power supply to the communication device; and a controller including a memory configured to store the correct user identification code, the controller being coupled to the communication device through a signal line and being configured to determine whether or not the user identification code received from the communication device matches the correct user identification code stored in the memory and to enable the leisure vehicle to be steered when it is determined that the received user identification code matches the correct user identification code.

In accordance with the theft prevention apparatus configured as described above, the electric power is supplied to the communication device equipped in the leisure vehicle when the process for certifying the user identification code is to be performed. As a result, battery power of the power supply (battery) loaded in the leisure vehicle is not wasted.

The communication device may be configured to transmit a request signal to the portable device to request the portable device to transmit a portable device detection signal to the communication device, when the hand-operated switch is tuned to the ON-state. The portable device may be configured to transition from a sleep state to an active state, upon receiving the request signal, and to transmit the user identification code to the communication device. In such a configuration, the battery power of the portable device is not wasted.

The theft prevention apparatus may further comprise a theft prevention module that is configured to have a theft prevention function and includes a lock module of the leisure vehicle. The controller may determine whether or not the user identification code transmitted from the portable device and received in the communication device matches the correct user identification code stored in the memory of the controller, and may cause the lock module to turn to an on-state to unlock at least a steering lock when it is determined that the received user identification code matches the correct user identification code. In such a configuration, the rider is able to push and move a motorcycle or the like, and the theft prevention apparatus is able to achieve high theft prevention functionality.

The theft prevention module may further include a fuel and ignition module of the leisure vehicle. The controller may determine whether or not the user identification code transmitted from the portable device and received in the communication device matches the correct user identification code and may cause the fuel and ignition module to be activated to enable an engine to start-up when the received user identification code matches the correct user identification code.

The lock module may include a user identification code match determiner that is coupled to the controller through a signal line and configured to store the correct user identification code. The communication device may be configured to send the user identification code transmitted from the portable device to the user identification code match determiner through the controller, and the user identification match code determiner may be configured to determine whether or not the user identification code matches the correct user identification code. The user identification code match determiner may cause the lock module to turn to the on-state to unlock at least the steering lock when the user identification code matches the correct user identification code. Since the lock module comprising the user identification code match determiner certifies the user identification code, the theft prevention apparatus is able to achieve high theft prevention functionality.

The fuel and ignition module may include a user identification code match determiner that is coupled to the controller through a signal line and configured to store the correct user identification code. The communication device may be configured to send the user identification code transmitted from the portable device to the user identification code match determiner through the controller, and the user identification match code determiner may be configured to determine whether or not the user identification code matches the correct user identification code. The user identification code match determiner may cause the fuel and ignition module to be activated when the user identification code matches the correct user identification code. Since the fuel and ignition module comprising the user identification code match determiner certifies the user identification code, the theft prevention apparatus is able to achieve high theft prevention functionality.

The theft prevention module may further include a meter module of the leisure vehicle, the meter module including a user identification code match determiner that is coupled to the controller through a signal line and configured to store the correct user identification code. The communication device may be configured to send the user identification code transmitted from the portable device to the user identification code match determiner through the controller, and the user identification match code determiner may be configured to determine whether or not the user identification code matches the correct user identification code. The user identification code match determiner may cause the meter module (meter or gauge) to be activated when the user identification code matches the correct user identification code. Since the meter module comprising the user identification code match determiner certifies the user identification code, the theft prevention apparatus is able to achieve high theft prevention functionality.

The theft prevention apparatus may further comprise a display device that is equipped in the leisure vehicle and is configured to answer back when the received user identification code matches the correct user identification code. This makes it possible for the rider to visually check that the user identification code has been certified.

A switch equipped in the leisure vehicle may serve as the hand-operated switch. The switch equipped in the leisure vehicle may be a kill switch of the engine or a lap time start/stop switch that is equipped in the leisure vehicle. Thereby, the theft prevention function is achieved without increasing the number of components.

The hand-operated switch may be a dial switch.

The controller may be configured to cause an engine to start-up by turning on a starter switch within a predetermined time from a time point when the user identification code received in the communication device matches the correct user identification code. The controller may be configured to return a control process to an initial state in which a theft prevention function is active when a match between the user identification codes is not detected after the time point. In such a configuration, the theft prevention apparatus is able to achieve a high theft prevention functionality and to inhibit wasteful consumption of battery power.

The portable device may be configured to send to the communication device, the user identification code and a battery signal indicating that a battery power of a battery loaded in the portable device is running short, when the battery power is running short. The communication device may be configured to send to the controller, the user identification code and the battery signal, upon receiving the user identification code and the battery signal. The controller may be configured to cause the display device equipped in the leisure vehicle to display information indicating that the battery power is running short. In such a configuration, battery exhaustion is desirably avoided.

The theft prevention apparatus may further comprise right and left directional antennae that are disposed on right and left sides of the leisure vehicle such that a rider's seat is located in a region where predetermined angular ranges of the antennae in which the antennae are able to receive radio wave overlap with each other, the antennae being coupled to the communication device through a communication line and being configured to be able to receive signals from the portable device in a case where the portable device is present within the predetermined angular ranges; and a comparator that is equipped in the leisure vehicle and is configured to compare intensities of the signals received from the right and left antennae. The controller may be configured to determine whether or not the user identification code transmitted from the portable device matches the correct user identification code when a difference between the intensities of the signals received from the right and left antenna is zero, or within a predetermined value.

Since the controller determines whether or not the user identification code transmitted from the portable device matches the correct user identification code when the difference between the intensities of the signals received from the right and left antennae is zero, or within the predetermined value, the theft prevention function is enhanced.

According to another aspect of the present invention, there is provided a theft prevention apparatus of a leisure vehicle that is configured to enable the leisure vehicle to be steered when a user identification code transmitted by radio matches a correct user identification code, the apparatus comprising a portable device configured to transmit the user identification code by radio; a communication device that is equipped in the leisure vehicle and is configured to receive the user identification code transmitted from the portable device; right and left directional antennae that are disposed on right and left sides of the leisure vehicle such that a rider's seat is located in a region where predetermined angular ranges of the antennae in which the antennae are able to receive radio wave overlap with each other, the antennae being coupled to the communication device through a communication line and being configured to be able to receive the signals from the portable device in a case where the portable device is present within the predetermined angular ranges; a comparator that is equipped in the leisure vehicle and is configured to compare intensities of the signals received from the right and left antennae; and a controller configured to determine whether or not the user identification code transmitted from the portable device matches the correct user identification code when a difference between the intensities of the signals received from the right and left antenna is zero or within a predetermined value.

In accordance with the theft prevention apparatus of the leisure vehicle configured as described above, the difference in the intensities of the signals received from the right and left antennae becomes zero or the within the predetermined value only when the rider is mounting the rider's seat. When the rider (owner) comes closer to the vehicle with a third party mounting the rider's seat, the process for certifying the user identification code is not performed. Likewise, when the rider is checking the motorcycle from the side, the process for certifying the user identification code is not performed if someone is coming closer to the motorcycle to steal it. As a result, there exists no chance of theft. Thus, high theft prevention functionality is achieved.

The predetermined angular ranges may be about 15 to 40 degrees.

The above and further objects and features of the invention will more fully be apparent from the detailed description with accompanying drawings.

DETAILED DESCRIPTION OF THE PREFERRED EMBODIMENTS

Hereinafter, embodiments of a theft prevention apparatus of a leisure vehicle according to the present invention will be described with reference to the accompanying drawings.

Embodiment 1

Figure 1:
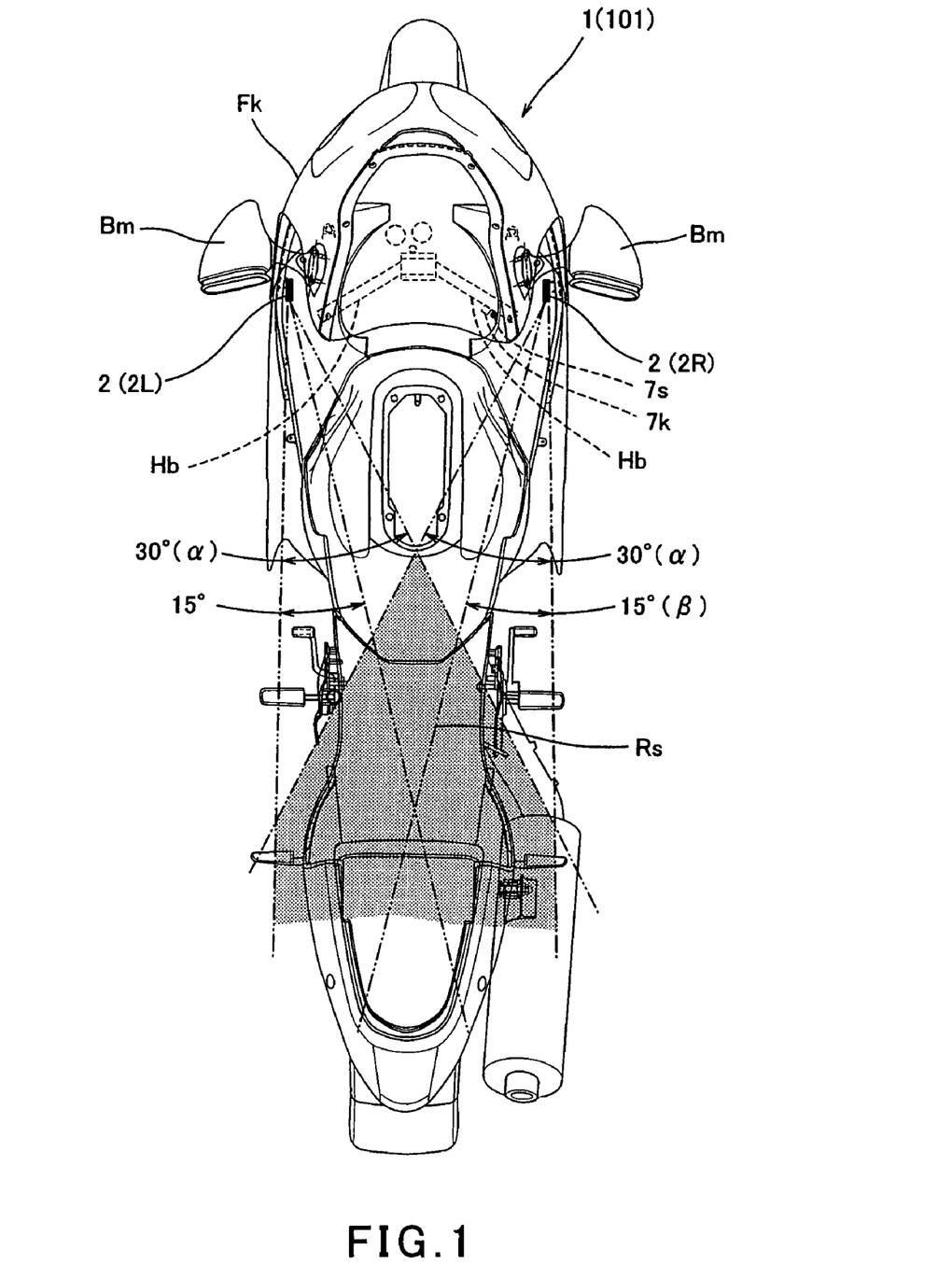
FIG. 1 is a plan view of an entire motorcycle according to an embodiment of the present invention.
Figure 2:
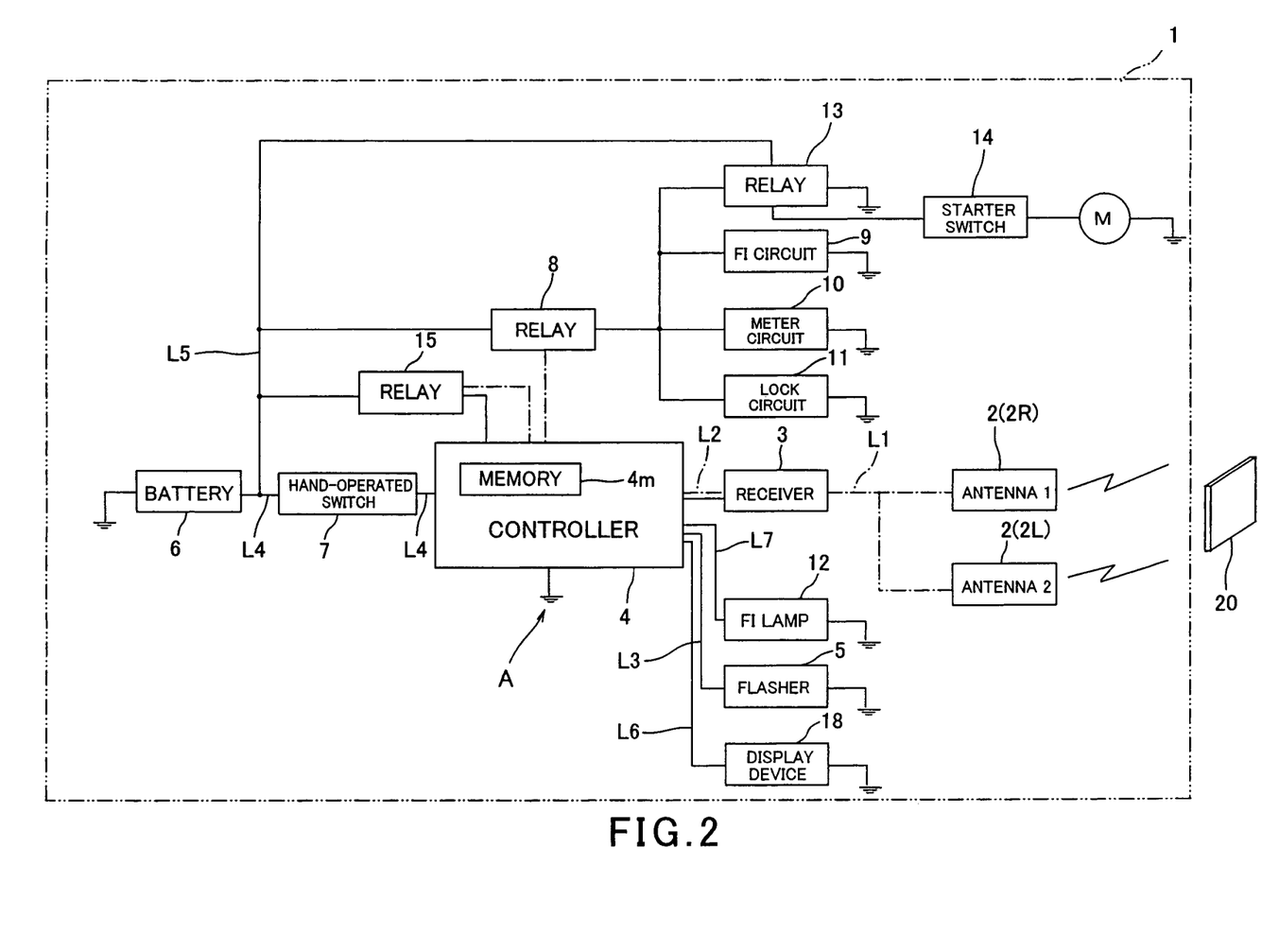
FIG. 2 is a block diagram schematically showing a configuration of a theft prevention apparatus of the motorcycle of FIG. 1.

Turning now to FIG. 1, a motorcycle 1 is a type of leisure vehicle and is equipped with an in-vehicle theft prevention apparatus A (FIG. 2).

As shown in FIG. 1, directional antennae 2 (2R and 2L) are mounted to mounting portions of back mirrors Bm on both sides of a front cowling Fk of the motorcycle 1.

As shown by a two-dotted line, the antennae 2R and 2L are each capable of receiving a radio wave in an angular range α of about 15 to 40 degrees. The direction of a center line of the angular range α that extends rearward from the antenna 2R (2L) and near a, center axis of the motorcycle 1 has an angle β of about 10 to 20 degrees with respect to a line extending rearward from the antenna 2R (2L) and in parallel with the center axis of the motorcycle 1. For example, in this embodiment, α is 30 degrees and β is 15 degrees. In FIG. 1, an overlapping region of the receivable angular ranges of the two antennae 2R and 2L is represented by dots. While the overlapping region of the angular ranges is defined such that the respective antennae 2R and 2L cover a rider's seat Rs, it is not intended to be limited to the depicted embodiment, but actually may be about 10 to 60 degrees or larger than 60 degrees.

As shown in FIG. 2, the antennae 2R and 2L are coupled to the receiver (communication device) 3 equipped in the motorcycle 1 through a signal line L1, and the receiver 3 is coupled to a controller 4 through a signal line L2. The controller 4 includes a comparison circuit (comparator) configured to compare two signals received by the receiver 3 through the antennae 2R and 2L to determine whether a difference in intensity between these two signals is zero or less than a predetermined value. If it is determined that the difference in intensity between the two signals is zero or less than the predetermined value, the controller 4 is configured to determine whether or not a received user identification (ID) code matches a correct user ID code for certification of the user ID code, which will be described later. On the other hand, if it is determined that the difference in intensity between the two signals is not less than the predetermined value, the controller 4 is configured not to execute a process for certifying the user ID code. It shall be appreciated that the comparison circuit may be equipped in the receiver 3.

The controller 4 contains a built-in memory 4m configured to store the correct user ID code. The controller 4 determines whether or not the user ID code transmitted from a portable device 20 carried in the pocket or the like of the rider to the receiver 3 matches the correct user ID code stored in the memory 4m of the controller 4.

The controller 4 is coupled to a flasher 5 of the motorcycle 1 through an electric wire L3, and is configured to answer back by flashing the flasher 5 when the received user ID code matches the correct user ID code. The controller 4 is coupled, through an electric wire L7, to a FI (fuel and ignition) lamp 12 configured to display a state of a FI circuit. If it is determined that the two ID codes do not match, the controller 4 causes the FI lamp 12 to flash to inform the rider of "mismatch."

The controller 4 is coupled to a battery (electric power supply) 6 loaded in the motorcycle 1 through an electric wire L4. A hand-operated switch 7 is provided in the electric wire L4 coupling the controller 4 to the battery 6. When the hand-operated switch 7 is being operated to an ON-position, is the electric power supplied from the battery 6 to the controller 4.

An electric wire L5 is configured to branch from a position of the electric wire L4 between the battery 6 and the hand-operated switch 7 and is connected, through a relay 8, to an FI circuit module (fuel and injection module) 9, a meter circuit module (meter module) 10, a lock circuit module (lock module) 11, and a relay 13 through which the electric power is supplied to a starter circuit to drive a starter motor M.

The relay 8 is turned ON and OFF in accordance with an electric signal from the controller 4 and is configured to supply the electric power from the battery 6 to the FI circuit module 9, the meter circuit module 10, the lock circuit module 11, and the relay 13. More specifically, upon the relay 8 being turned ON, the electric power is supplied from the battery 6 to the FI circuit module 9, the meter circuit module 10, and the lock circuit module 11. Thereby, the FI circuit module 9 and the meter circuit module 10 are turned to an ON-state. In addition, the lock circuit module 11 becomes active to unlock a steering lock or a locking device configured to hold a helmet. Furthermore, the relay 13 is turned ON and the starter circuit is turned ON. Under this condition, the engine of the motorcycle 1 is ready to start-up and the motorcycle 1 becomes steerable.

The electric wire L5 branches and is connected to the controller 4 through the relay 15 to allow the electric power to be supplied to the controller 4 through the relay 15 after the operation of the hand-operated switch 7 terminates to cause the hand-operated switch 7 to turn to an OFF-position. The relay 15 and the controller 4 have a self maintenance function to supply the electric power to the controller 4.

The electric wire L5 further branches and is configured to couple, through the relay 13, a starter switch 14, the starter motor M provided downstream of the starter switch 14, and the battery 6.

Figure 3A:
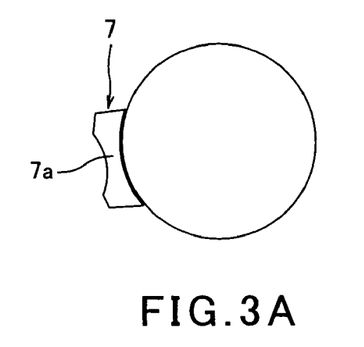
FIG. 3A is a view schematically showing a hand-operated switch forming a part of the theft prevention apparatus of FIGS. 1 and 2.
Figure 3B:
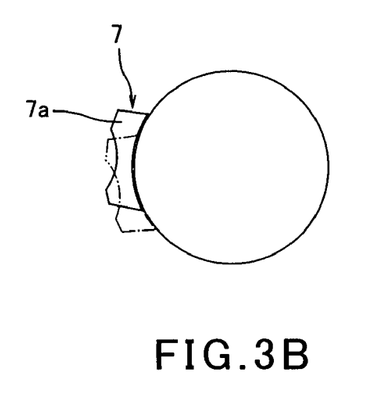
FIG. 3B is a view of the hand-operated switch, schematically showing a state in which a slidable lever is slid clockwise to move one position from the state in FIG. 3A.

The hand-operated switch 7 may be a kill switch 7k including a slidable switch which is disposed in the vicinity of a right grip of a handle bar Hb of the motorcycle 1 shown in FIG. 1. It would be desirable to use a position added to the kill switch configured to stop the engine, since the number of components will not increase. As shown in FIGS. 3A and 3B, if the rider operates the hand-operated switch 7 to cause a slidable lever 7a to move counterclockwise from a home position as indicated by a solid line in FIG. 3B to a position as indicated by a solid line in FIG. 3A against a spring force for holding the state indicated by the solid line of FIG. 3B, the electric power is able to be supplied to the controller 4 and the receiver 3 while the rider is operating the slidable lever 7a. As soon as the thumb stops operating the slidable lever 7a, the slidable lever 7a returns to the home position by the spring force. The kill switch may be replaced by a lap time start/stop switch 7s provided in the vicinity of a right grip of the handle bar.

Figure 3C:
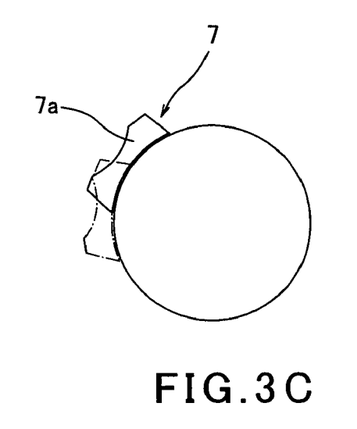
FIG. 3C is a view of the hand-operated switch, schematically showing a state in which the slidable lever is slid clockwise to move two positions from the state in FIG. 3A.

The kill switch, which is the hand-operated switch 7, may be configured to be operated by the rider to cause the slidable lever 7a to slide from the home position indicated by the solid line in FIG. 3B to a position indicated by a solid line in FIG. 3C, thereby turning the kill switch to an ON-position to stop the engine. As a result, the running engine stops, or otherwise, the engine in a stopped state is prevented from start-up. In addition, the kill switch may be configured to be operated by the rider to cause the slidable lever 7a to slide from the position indicated by the solid line in FIG. 3C to the home position indicated by the solid line in FIG. 3B, thereby returning the kill switch to an OFF-position. With the slidable lever 7a in the position indicated by the solid line in FIG. 3B, the engine in the stopped state is able to start-up.

The slidable lever 7a has a detent function to keep the positions indicated by the solid lines of FIG. 3B and 3C, unless it is intentionally moved to another position by the rider.

In the motorcycle 1 of this embodiment, even when the slidable lever 7a of the kill switch 7 which is the hand-operated switch 7 is moved to an ON-position indicated by the solid line in FIG. 3C to stop the running engine, the engine is able to re-start up by returning the slidable lever 7a to the home position indicated by the solid line in FIG. 3B within a predetermined time, for example 10 minutes required for fueling. In this case, however, the theft prevention apparatus is functioning, and therefore, the engine is unable to re-start up unless the user ID code received from the portable device 20 at this time has been certified.

In this embodiment, as shown in FIG. 2, the controller 4 is coupled through an electric wire L6 to a display device 18 installed on a meter panel of the motorcycle 1. If the battery power of the portable device 20 of the theft prevention apparatus is running short, this information is transmitted from the portable device 20 to the receiver 3. The receiver 3 (or the controller 4) causes the display device 18 to display information indicating that the battery power of the portable device 20 is running short, to be presented to the rider. According to this information, the rider replaces the battery of the portable device 20.

Figure 4:
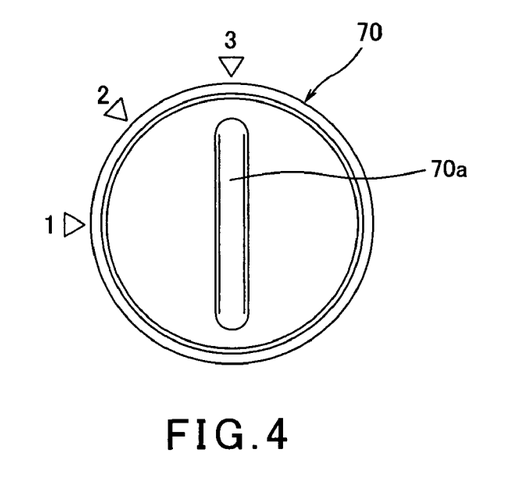
FIG. 4 is a view of a hand-operated switch of a dial type.

As an alternative to the hand-operated switch 7 in FIGS. 3A, 3B, and 3D, as shown in FIG. 4, a dial switch 70 may be independently provided, including a movable portion 70a capable of being set in a position selected from plural positions (e.g., three positions in the embodiment in FIG. 4), or otherwise, a switch having another configuration may be provided so long as it easily turns ON and OFF connection operation between the battery 6 and the controller 4. In FIG. 2, one-dotted lines connecting the blocks indicate signal lines and solid lines indicate the electric wires.

The theft prevention apparatus configured as described above functions as described below. A control process executed by the controller 4 and the associated theft prevention function will be described with reference to the flowchart of FIG. 5.

Figure 5:
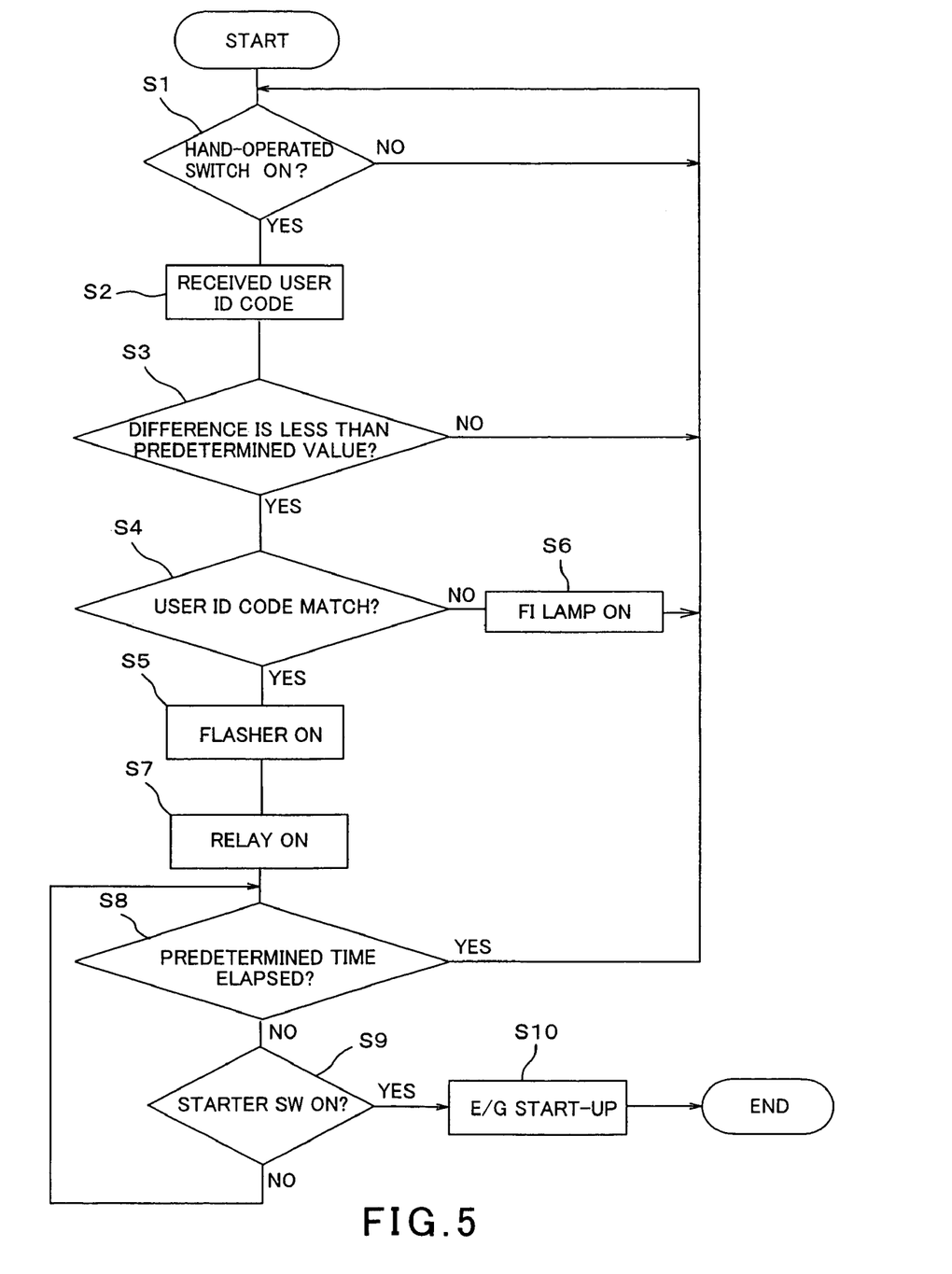
FIG. 5 is a flowchart showing a control process of the theft prevention apparatus.

Assume that the rider is mounting the rider's seat Rs of the motorcycle 1 and operates the hand-operated switch 7 with the portable device 20 put in the pocket or the like (step S1). Upon this operation, the user ID code being transmitted from the portable device 20 is received by the antennae 2 (2R and 2L) (step S2). The received user ID code is transmitted to the controller 4 through the receiver 3. The controller 4 compares intensities of the received signals from the right and left antenna 2R and 2L (step S3). When the rider is mounting the rider's seat Rs as described above, the difference in the intensity is zero or less than the predetermined value. If it is determined that the difference in the intensity is less than the predetermined value, the controller 4 determines whether or not the received user ID code matches the correct user ID code stored in the memory 4m (step S4). On the other hand, if it is determined that the difference is not less than the predetermined value, the controller 4 returns the process to step S1.

If it is determined that the two user ID codes match in step S4, the controller 4 causes the flasher 5 of the motorcycle 1 to flash to inform the rider of the match between the two ID codes (step S5), and advances the process to step S7 described below. On the other hand, if it is determined that the two user ID codes do not match, the controller 4 causes the FI lamp 12 of the motorcycle 1 to flash to inform the rider of the mismatch (step S6).

When the two user ID codes match, the controller 4 turns ON the relay 8 to turn each of the FI circuit module 9 and the meter circuit module 10 to an ON-state (active state), and turns ON the relay 13 (step S7). In addition, the controller 4 turns the lock circuit module 11 to an ON-state (active state) to unlock the steering lock or the holding device of the helmet. Furthermore, the controller 4 turns ON the relay 15 to enable the electric power to continue to be supplied to the controller 4.

Then, the controller 4 activates a timer configured by software (program) (step S8). If the rider turns the starter switch 14 of the engine to an ON-position within a predetermined time, for example, five minutes (step S9), the starter motor M rotates while the starter switch 14 is in the ON-position, causing the engine to start-up (step S10). So, the control process for the theft prevention terminates. On the other hand, if the predetermined time (e.g., five minutes) has elapsed with the starter switch 14 unoperated, the controller 4 returns the process to an initial state (START in FIG. 5). In other words, after an elapse of the predetermined time, the engine is unable to start-up unless the steps for certifying the user ID code have been accomplished again.

In the motorcycle 1 of this embodiment, if the slidable lever 7a of the kill switch, which is the hand-operated switch 7, is moved to the position indicated by the solid line of FIG. 3C, the relay 8 is turned OFF, and the engine stops.

In accordance with the motorcycle 1 of this embodiment, when the engine stops for fueling or the like, the controller 4 turns ON the relay 8 and the relay 15 for a predetermined time required for fueling or the like, for example, 10 minutes, and maintains this state. For the predetermined time, the process for certifying the user ID code between the portable device 20 and the controller 4 via the receiver 3 is carried out repeatedly at appropriate time intervals. If the rider is mounting the rider's seat Rs, the process transitions from step S3 to step S4 in the flowchart of FIG. 15, and thereby the engine is able to start-up. On the other hand, if the rider is not mounting the rider's seat Rs, the process transitions from step S3 to step SI rather than step S4. In this case, since the user ID code is not certified, the theft prevention function is active. As a result, the motorcycle 1 will not be stolen while the rider is away from the motorcycle 1.

Even when the engine is stopped with the kill switch, it is able to be re-started up by the user's operation of the starter switch 14 within the predetermined time so long as the rider is mounting the rider's seat with the portable device 20 put in the pocket or the like.

In accordance with the theft prevention apparatus of the motorcycle 1 of this embodiment, the electric power is not substantially consumed on the motorcycle 1 side before the hand-operated switch 7 is operated. As a result, wasteful power consumption of the battery is inhibited. In addition, the process for certifying the user ID code is carried out only when the rider is positioned in a predetermined location, for example, the rider's seat Rs, whereas the process for certifying user ID code is not executed when the rider is positioned in a different location, for example, laterally of the motorcycle 1. Thus, theft prevention function is enhanced.

The engine control unit (ECU) of the motorcycle 1, or otherwise, another controller may function as the controller 4 of this embodiment. Nonetheless, the ECU is desirably employed as the controller 4, without an increase in the number of components and an increase in a manufacturing cost.

Embodiment 2

A theft prevention apparatus of a leisure vehicle according to a second embodiment will be described with reference to FIGS. 6 and 7.

Figure 6:
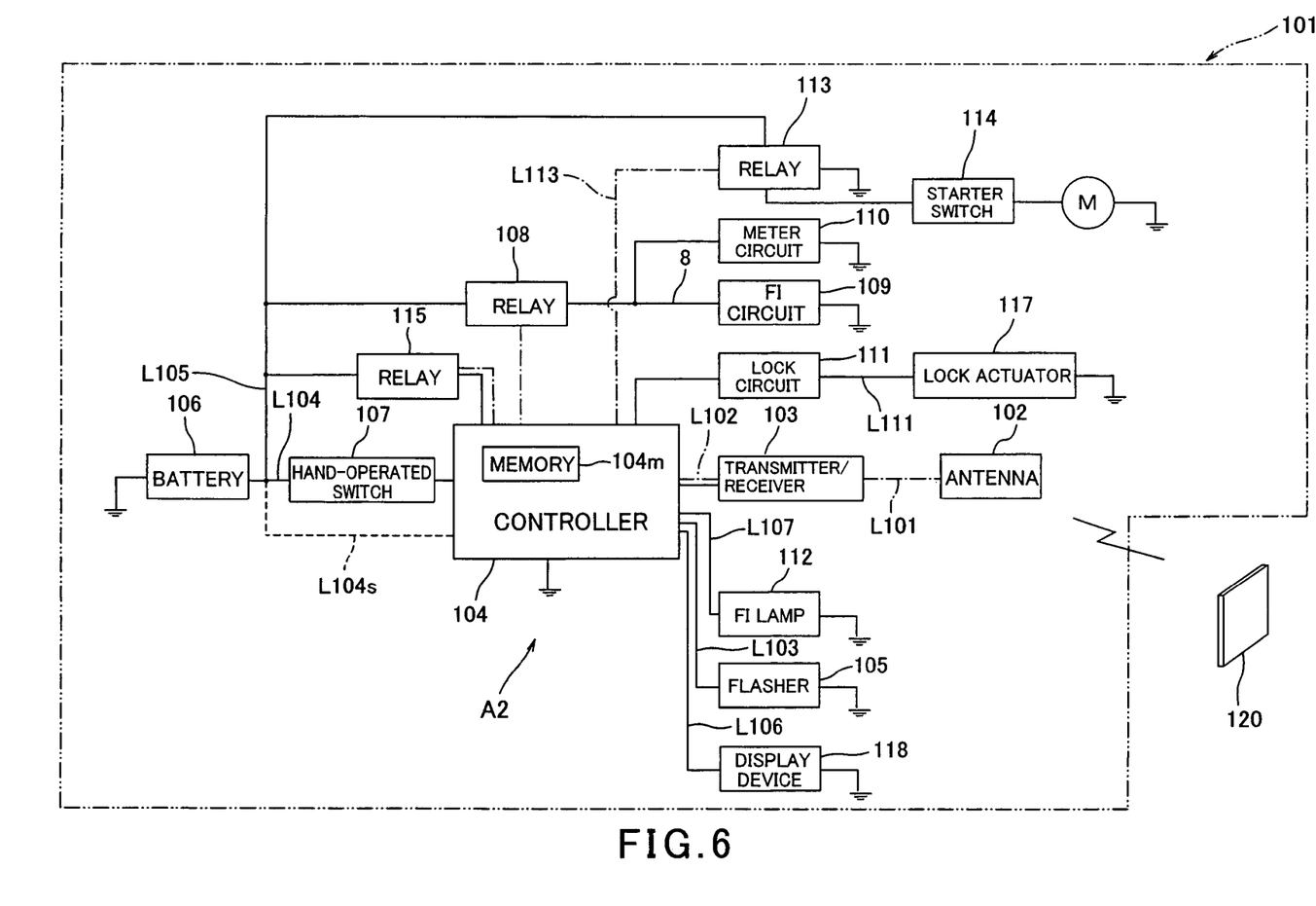
FIG. 6 is a block diagram showing another configuration of the theft prevention apparatus of the motorcycle.
Figure 7:
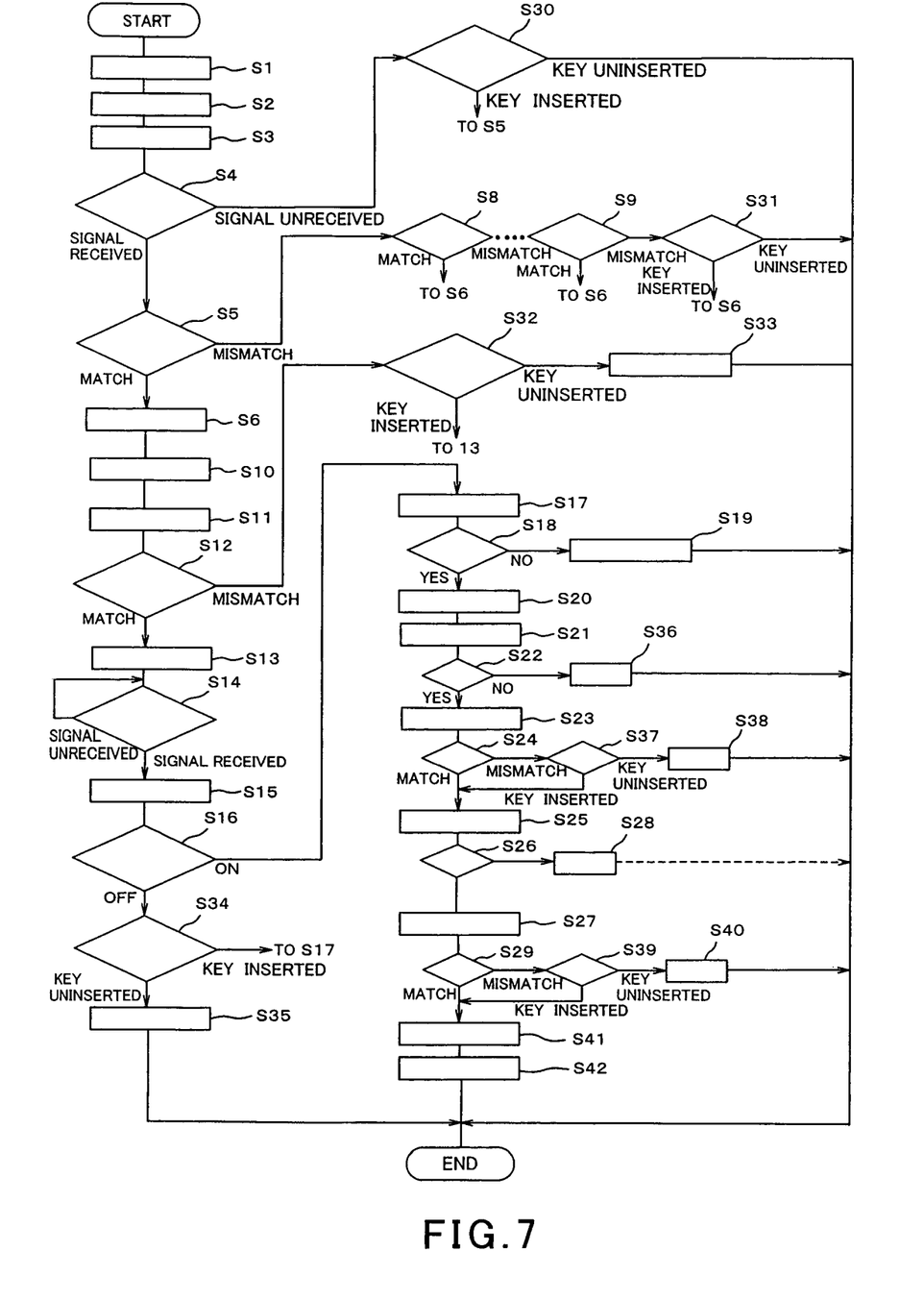
FIG. 7 is a flowchart showing a control process of the theft prevention apparatus of FIG. 6.

Turning to FIG. 6, an in-vehicle theft prevention apparatus A2 is mounted in a motorcycle 101, including a communication device (transmitter/receiver) 103. The in-vehicle theft prevention apparatus A2 has an antenna 102 for transmission and reception, which is provided in a position of the motorcycle 101, for example, under the rider's seat Rs.

The antenna 102 is configured to receive a signal from all directions and to transmit a signal to all directions. The antenna 102 is, as shown in FIG. 6, connected, through a signal line L101, to the transmitter/receiver (communication device) 103, which is in turn connected to a controller 104 through a signal line L102.

The controller 104 includes a built-in memory 104m configured to store a correct user ID code. The controller 104 determines whether or not a user ID code transmitted from a portable device 120 being carried in the pocket or the like of the rider and received by the transmitter/receiver 103 matches the correct user ID code stored in the memory 104m.

The controller 104 is coupled to a flasher 105 of the motorcycle 101 through an electric wire L103. If it is determined that the user ID code transmitted from the portable device 120 matches the correct user ID code, the controller 104 answers back by flashing the flasher 105.

The controller 104 is coupled to an FI lamp (lamp that displays a state of the FI circuit module) 112 through an electric wire L107, and is configured to selectively flash the FIlamp 112 if the two ID codes do not match, to inform the rider of the mismatch between the two codes.

The controller 104 is coupled to a lock circuit module (lock module) 111 and a lock actuator 117 through an electric wire L111. A control operation of the controller 104 and an operation control of the lock circuit module 111 enable the electric power to be supplied to the lock actuator 117, which thereby is activated. The lock actuator 117 is not intended to be limited to a lock actuator configured to lock and unlock a steering lock, but may be a lock actuator configured to lock and unlock a helmet lock or a seat lock, a lock actuator configured to lock and unlock a fuel cap, or otherwise an actuator configured to lock and unlock a saddle bag.

The controller 104 is coupled to a battery 106 loaded in the motorcycle 101 through an electric wire L104. A hand-operated switch 107 is provided in a position of the electric wire L104. The controller 104 is configured to turn ON a relay 115 and a relay 108, upon the hand-operated switch 107 being turned to an ON-position.

In the second embodiment, the controller 104 is directly coupled to the battery 106 side through an electric wire L104s indicated by a broken line, and is configured to be supplied with a minute current (minute electric power) from the battery 106 before the hand-operated switch 107 is turned to an ON-position. The supplied minute current enables the controller 104 to move to and keep a "sleep state" (standby state).

Upon the hand-operated switch 107 being operated, the relay 115 is turned ON. Thereby, an electric wire L105 which branches from a position of an electric wire L104 between the hand-operated switch 107 and the battery 106 is connected to the controller 104 through the relay 115, thereby allowing the electric power to be supplied from the battery 106 to the controller 104. Thereby, with the hand-operated switch 107 being in an OFF-position after the operation of the hand-operated switch 107 terminates, the electric power is able to be supplied to the controller 104. That is, the relay 115 and the controller 104 have a self maintenance function to supply the electric power to the controller 104.

As described above, upon the hand-operated switch 107 being operated, the relay 108 is turned ON. The electric wire L105 is connected to the FI circuit module (fuel and ignition module) 109 and to the meter circuit module (meter module) 110 through the relay 108. In addition, the electric wire L105 is connected, through the relay 113, to the starter circuit (starter system) including the starter motor M and a starter switch 114, which are turned to an ON-state upon the relay 113 being turned ON.

The relay 108 is turned ON and OFF in accordance with a control signal from the controller 104, and is configured to supply the electric power from the battery 106 to the FI circuit module 109, and to the meter circuit module 110.

The electric wire L105 is connected to the starter switch 114 and the starter motor M through the relay 113, which is in turn connected to the controller 104 through a signal line L113. The relay 113 is turned ON and OFF in accordance with the control signal from the controller 104, and is configured to supply the electric power from the battery 106 to the starter switch 114 and the starter motor M.

Each of the lock circuit module 111, the FI circuit module 109, and the meter circuit module 110 includes a CPU (user identification match determiner) containing a built-in memory configured to store a correct user ID code therein. Each of the circuit modules 111, 109, and 110, to be precise, the CPU included therein, is configured to execute a process for certifying the user ID code after the process for certifying the user ID code has been accomplished in the controller 104.

The lock circuit module 111, the FI circuit module 109, and the meter circuit module 110 are coupled to the controller 104 through a CAN (controller area network), and are configured to receive the received user ID code of the portable device 120 from the controller 104 that has received the user ID code via the transmitter/receiver 103.

In the second embodiment, the hand-operated switch 107 is a start/stop switch including a push button switch which is provided in the vicinity of a right grip of a handle bar Hb of the motorcycle 101 of FIG. 1. Instead of the start/stop switch, the existing lap time start/stop switch or otherwise the kill switch having an altered configuration may be used. In a further alternative, the dial switch 70 or the like as shown in FIG. 4 may be independently provided.

The start/stop switch, which is a type of the hand-operated switch 107, is configured to start-up and stop the engine by a short-time (about one second) operation and a long-time (about two to three seconds) operation. More specifically, by the short-time operation, a control for starting-up the engine starts, whereas by the long-time operation, a control for stopping the engine is executed.

In the second embodiment, as shown in FIG. 6, the controller 104 is coupled, through an electric wire L106, to a display device 118 installed on, for example, a meter panel. If the battery power of the portable device 120 of the theft prevention apparatus is running short, the portable device 120 transmits this information to the transmitter/ receiver 103. Upon the transmitter/receiver 103 receiving the signal, the controller 104 causes the display device 118 to display a warning indicating that the battery power of the portable device 120 is running short, to be presented to the rider. According to the warning, the rider replaces the battery.

In FIG. 6, one-dotted lines connecting the respective block components indicate signal lines, solid lines indicate power lines, and broken lines indicate power lines through which the minute current is supplied.

In the second embodiment, the in-vehicle theft prevention apparatus A2 transmits, to the portable device 120, a request signal for requesting the portable device 120 to transmit a predetermined portable device detection signal to the apparatus A2. Receiving the request signal, the portable device 120 transitions from a sleep mode to an active mode, and transmits the portable device detection signal to the in-vehicle apparatus A2. During the sleep mode, the portable device 120 is configured to consume only a minute electric power for receiving the request signal.

The above mentioned theft prevention apparatus enables or disenables a theft prevention function as described below in detail. Hereinbelow, the control process or the like executed by the controller 104 and the associated theft prevention function will be described with reference to a flowchart of FIG. 7.

When the rider, carrying the portable device 120 in the pocket or the like, operates the hand-operated switch (start/stop switch) 107 of the motorcycle 101 for a short time within a predetermined distance over which the portable device 120 and the transmitter/receiver 103 are able to communicate each other (step S1), the controller 104 transitions from the sleep mode to the active mode. The controller 104 causes the relay 115 to be turned ON so that the electric power continues to be supplied from the battery 106 to the controller 104 (step S2). The controller 104 transmits a request signal to the portable device 120 through the transmitter/receiver 103 and the antenna 102 to request the portable device 120 to transmit the portable device detection signal (step S3).

Receiving the request signal, the portable device 120 transitions from the sleep mode (standby state) during which only a minute electric power is consumed, to the active mode, and determines whether or not the request signal matches a predetermined signal. If it is determined that these two signals match, the portable device 120 transmits the portable device detection signal to the controller 104 side. On the other hand, if it is determined that the two signals do not match, the portable device 120 does not transmit the portable device detection signal to the controller 104 side. In that case, the controller 104 determines whether or not it has received the portable device detection signal from the portable device 20 within a predetermined time after the controller 104 has transmitted the request signal (step S4). If it is determined that the controller 104 has received the portable device detection signal within the predetermined time, the controller 104 advances the process to step S5. On the other hand, if it is determined that the controller 104 does not receive the portable device detection signal within the predetermined time, the controller 104 detects whether or not a key with transponder containing a predetermined ID code to be described later has been inserted into a key switch of the motorcycle 101 (step S30). If the key is detected as being uninserted, then the controller 104 terminates the control process for disabling the theft prevention function, and therefore, the FIlamp 112 does not flash and the display device 118 does not display any information. At this time, the FI lamp 112 is configured not to flash and the display device 118 is configured not to display any information to inhibit any mischievous attempt to operate the hand-operated switch 107 by a third party, which will cause the FI lamp 112 to flash or the display device 118 to display some information.

On the other hand, if the key is detected as being inserted into the key switch, then the controller 104 advances the process to step S5.

Receiving the portable device detection signal, the controller 104 determines whether or not the detection signal is associated with a first portable device 120 of portable devices 120 belonging to one group, based on a signal code contained in the portable device detection signal (step S5). If it is determined that the signal code matches a predetermined signal code of the first portable device 120, the controller 104 transmits a user ID code transmission request signal to the portable device 120 to request the portable device 120 to transmit the user ID code to the controller 104 (step S6). On the other hand, if it is determined that the signal code does not match the predetermined signal code of the first portable device 120 in step S6, the controller 104 determines whether or not the signal code matches a predetermined signal code of a second portable device 120 belonging to the group (step S8), and then determines whether or not the signal code matches a predetermined signal code of a third portable device 120 belonging to the group if it is determined that the signal code does not match the predetermined code of the second portable device 120 (step S9). In this manner, the controller 104 executes a determination process until detecting a match between the two signal codes. In this embodiment, since the number of the portable devices 120 belonging to the group is set to five, the controller 104 typically executes the determination process five times at maximum, although the controller 14 executes the determination process three times in the embodiment of FIG. 7. This configuration is intended for use by an entire family so that up to five persons can share the motorcycle 101. It will be appreciated that the number of the portable devices 120 belonging to the group may be more than or less than five.

Finally, if it is determined that the signal code does not match any of the predetermined codes of the portable devices 120, the controller 104 detects whether or not the key with transponder containing the predetermined code has been inserted into the key switch provided on the panel or the like of the motorcycle 101 (step S31). If the key is detected as being uninserted, then the controller 104 terminates the control process for disenabling the theft prevention function.

On the other hand, if it is determined that the signal code matches the signal code of any of the portable devices 120 in steps S8 to S9, or otherwise, the key is detected as being inserted into the key switch in step S31, the controller 104 advances the process to step S6.

Receiving the user ID code transmission request signal from the controller 104 in step S7, the portable device 120 transmits the user ID code to the controller 104 side. The controller 104 receives the user ID code through the transmitter/receiver 103 of the motorcycle 101 (step S10).

Receiving the user ID code transmitted from the portable device 120, the controller 104 calls the correct user ID code stored in the memory 104m (step S11), and determines whether or not the received user ID code matches the correct user ID code (step S12). If it is determined that these two codes match, then the controller 104 turns ON an electric circuit configured to supply the electric power to the lock circuit module 111 and sends an unlock request signal for executing an unlock process to the lock circuit module 111 via the CAN (step S13), and awaits a user ID code transmission request signal from the lock circuit module 111 to request the controller 104 to send the received user ID code from the portable device 120 to the lock circuit module 111 (step S14).

Receiving the unlock request signal, the lock circuit module 111 sends the user ID code transmission request signal to the controller 104 via the CAN. Receiving the request signal, the controller 104 sends the received user ID code to the lock circuit module 111 (step S15).

On the other hand, if it is determined that the two user ID codes do not match in step S12, it is detected whether or not the key with transponder containing the predetermined code has been inserted into the key switch (step S32). If the key is detected as being uninserted, then the controller 104 causes the FI lamp 112 to flash to inform the user of the portable device 120 that the key is uninserted, and causes the display device 118 to display this information in the form of character strings or graphic symbols (step S33). Thereby, the control process for disabling the theft prevention function terminates.

The lock circuit module 111 is configured to execute the process for certifying the user ID code utilizing the CAN to prevent the motorcycle 101 from being stolen by changing a board (control board) of the controller 104. In step S33, the FI lamp 112 flashes and the display device 118 displays some information for the sake of the rider's convenience, since any mischievous attempt to operate the hand-operated switch 107 by a third party will not be made, once the controller 104 has certified the user ID code.

Receiving the user ID code, the CPU (determiner) of the lock circuit module 111 determines whether or not the received user ID code matches the correct user ID code stored in the memory of the CPU. If it is determined that these two codes match, the electric circuit of the lock circuit module 111 is turned ON, thereby causing the motorcycle 101 to move to an unlocking-ON mode.

On the other hand, if it is determined that the two codes do not match, the motorcycle 101 does not move to the unlocking-ON mode unless the key with transponder is inserted into the key switch. In other words, an unlocking-OFF mode is maintained.

The lock circuit module 111 transmits a signal indicating "unlocking-ON" or "unlocking-OFF" to the controller 104, and thus, the control process for unlocking terminates.

The controller 104 determines whether the received signal from the lock circuit module 111 is "unlocking-ON" or "unlocking-OFF" (step S16). If it is determined that the received signal is "unlocking-ON," the controller 104 causes the display device 118 to display this information (step S17). In the unlocking-ON mode, the electric power is supplied from the battery 106 to the lock circuit module 111 through the relay 115 and the controller 104. Thereby, the lock actuator 117 activates, thereby unlocking the steering lock, the helmet lock, or the seat lock. In this case, in the second embodiment, since the electric power which is supplied to the locking actuator 117 is not so large, it is supplied to the lock circuit module 117 through the controller 104.

If it is determined that the received signal is "unlocking-OFF" in step S16, the controller 104 detects whether or not the key with transponder has been inserted into the key switch (step S34). If the key is detected as being uninserted, then the controller 104 causes the FI lamp 112 to flash and the display device 118 to display this information (step S35), and thus the control process for disenabling the theft prevention function of the theft prevention apparatus terminates. In this case, the theft prevention function is maintained.

If the key is detected as being inserted into the key switch in step S34, then the controller 104 advances the process to step S117.

The display device 118 displays the information regarding "unlocking-ON" or "unlocking-OFF" in step S35 to present the rider with this information, since the display of the information on the display device 118 does not result from a mischievous attempt by a third party, once the controller 512 has certified the user ID code.

With only the lock circuit module 111 in unlocking-ON mode, the rider can push and move the motorcycle 101.

In this embodiment, in the unlocking-ON mode, the lock circuit module 111 activates a built-in timer from the time point when the lock circuit module 111 has moved to the unlocking-ON mode. The controller 104 determines whether or not a second "short-time operation" of the hand-operated switch 107 to be described later has been performed and the signal (user ID code) from the portable device 120 has been received within a predetermined time, for example, 10 minutes, after the timer starts (step SI 8). If it is determined that the signal from the portable device 120 has not been received and the "short-time operation" has not been performed, within the predetermined time, for example, 10 minutes, the controller 104 causes the lock circuit module 111 to transition to an unlocking-OFF state (step S19) to thereby cause the steering lock, the seat lock, or the like to turn to an ON-state, thus enabling the theft prevention function to prevent theft of the motorcycle 101. Thus, the control process for unlocking, that is associated with the lock circuit module 111 and the controller 104 terminates.

After the unlocking-ON process has finished, if the rider re-operates the hand-operated switch 107 for a short time, that is, the rider performs the second short-time operation within the predetermined time, the controller 104 turns ON the relay 108 (step S20), and the electric power is supplied to the meter circuit module 110 and the FI circuit module 109 (step S21).

The meter circuit module 110, being supplied with the electric power, sends, via the CAN, a user ID code transmission request signal to the controller 104 to request the controller 104 to send the user ID code to the meter circuit module 110.

The controller 104 determines whether or not it has received the user ID code transmission request signal from the meter circuit module 110 within a predetermined time (about 30 seconds) (step S22). If it is determined that it has received the request signal, the controller 104 sends the user ID code to the meter circuit module 110 via the CAN (step S23). On the other hand, if it is determined that the request signal has not been received, the controller 104 causes the FI lamp 112 to flash to inform the rider of this, or causes the display device 118 to display this information in the form of character strings or graphic symbols to be presented to the rider (step S36). Thereby, the control process for the meter circuit module 110 terminates, and hence the meter circuit module 110 remains inactive. As a result, the theft prevention function is maintained.

The meter circuit module 110 is configured to execute the process for certifying the user ID code utilizing the CAN to prevent the motorcycle 101 from being stolen by changing boards of the controller 104 and the lock circuit module 111. In step S36, the FI lamp 112 flashes and the display device 118 displays some information to inform the rider that the user ID code transmission request signal is not transmitted from the meter circuit module 110, since the flash of the FI lamp 112 or the display of the information on the display device 118 does not result from mischievous attempt by a third party, once the controller 104 has certified the user ID code.

Receiving the user ID code from the controller 104, the CPU (determiner) of the meter circuit module 110 determines whether or not the received user ID code matches the correct user ID code stored in the memory of the CPU included in the meter circuit module 110. If it is determined that these two user ID codes match, the meter circuit module 110 is turned to an ON-state (active state). In the second embodiment, when the meter circuit module 110 moves to the ON-state (active state), meters or gauges move to an active state, and head lamps or the like also move to an active state.

On the other hand, if it is determined that the two codes do not match, the meter circuit module 110 remains in an OFF-state (inactive state) unless the key with transponder is inserted into the key switch. In this state, the meters or gauges of the motorcycle 101 remain in the inactive state, and thus the theft prevention function is active.

The meter circuit module 110 transmits a signal indicating "match" or "mismatch" to the controller 104.

The controller 104 receives the signal indicating "match" or "mismatch" from the meter circuit module 110 and detects whether the received signal is "match" or "mismatch" (step S24). If the received signal is detected as being a "match", the controller 104 causes the display device 118 to display this information (step S25).

On the other hand, if the received signal is detected as being a "mismatch," the controller 104 detects whether or not the key with transponder has been inserted into the key switch (step S37). If the key is detected as being uninserted, the controller 104 causes the FI lamp 112 to flash and the display device 118 to display this information (step S38). Thus, the control process for the meter circuit module 110 terminates, and the meter circuit module 110 remains in an inactive state. As a result, the theft prevention function is maintained. On the other hand, if the key is detected as being inserted into the key switch in step S37, the controller 104 advances the process to step S25.

Then, when the meter circuit module 110 moves to an active state, the controller 104 moves to a standby mode to await a user ID code transmission request signal from the FI circuit module 109 to request the controller 104 to send the user ID code to the FI circuit module 109. The FI circuit module 109 sends the user ID transmission request signal to the controller 104 via the CAN. The controller 104 determines whether or not the user ID code transmission request signal has been received from the FI circuit module 109 (step S26). If it is determined that the controller 104 has received the request signal, the controller 104 sends the user ID code to the FI circuit module 109 via the CAN (step S27).

If the request signal is not transmitted from the FI circuit module 109 within a predetermined time (about 30 seconds), the controller 104 causes the FI lamp 112 to flash to inform the user that the request signal is not transmitted, and causes the display device 118 to display this information in the form of character strings or graphic symbols to be presented to the rider (step S28).

The FI circuit module 109 is configured to execute the process for certifying the user ID code utilizing the CAN to prevent the motorcycle 101 from being stolen by changing boards of the controller 104, the lock circuit module 111 and the meter circuit module 110. In step S28, the FI lamp 112 flashes and the display device 118 displays information to inform the rider that the user ID code transmission request signal is not transmitted from the FI circuit module 109, since the flash of the FI lamp 112 or the display of the information on the display device 118 does not result from a mischievous attempt by a third party, once the controller 104 has certified the user ID code.

Receiving the user ID code from the controller 104, the CPU (determiner) of the FI circuit module 109 determines whether or not the received user ID code matches the correct user ID code stored in the memory of the CPU. If it is determined that these two codes match, the controller 104 turns the FI circuit module 109 to an ON-state (active state). Thereby, the fuel supply system of the engine becomes active and the ignition system of the engine becomes active.

On the other hand, if it is determined that the two codes do not match, the FI circuit module 109 maintains an OFF-state (inactive state) unless the key with transponder is inserted into the key switch. As a result, no fuel is supplied to the engine and the ignition system and the start-up system maintain an OFF-state. Under this condition, the engine of the motorcycle 101 is unable to start-up, and thus the theft prevention function is active.

The FI circuit module 109 sends a signal indicating a "match" or "mismatch" to the controller 104. Receiving the signal indicating a "match" or "mismatch" from the FI circuit module 109, the controller 104 detects whether the received signal is "match" or "mismatch" (step S29). If the received signal is detected as being "match", the controller 104 causes the display device 118 to display this information, and causes the relay 113 to be turned ON (step S41). Thereby, the start-up system of the engine moves to an ON-mode.

When the FI circuit module 109 moves to an ON-state, the controller 104 causes the flasher 105 to flash to inform the rider that all the theft prevention functions equipped in the motorcycle 101 have been disenabled (step S42). Thus, the control process for the theft prevention function terminates.

The flashing of the flasher 105, which is an answerback, informs the rider that the motorcycle 101 is now ready to start-up the engine and is in a steerable condition.

On the other hand, if the received signal is detected as being "mismatch" in step S29, the controller 104 detects whether or not the key with transponder has been inserted into the key switch (step S39). If the key is detected as being uninserted, the controller 104 causes the FI lamp 112 to flash, and causes the display device 118 to display this information (step S40). Thus, the control process for the FI circuit module 109 terminates, and the FI circuit module 109 remains in an inactive state. As a result, the theft prevention function is maintained. If the key is detected as being inserted into the key switch, the controller 104 advances the process to step S41.

The controller 104 is configured to advance the process to a subsequent step, if the key with transponder is detected as being inserted into the key switch of the motorcycle 101 and if the ID code stored in the transponder matches the correct ID code, even when it is determined that the signal code of the portable device detection signal is not the predetermined signal code, or it is determined that the received user ID code does not match the correct user ID code.

As should be appreciated, in cases where the rider has the key with transponder without carrying the portable device 120, the rider is able to ride in the motorcycle 101 having the above-mentioned theft prevention function. Conveniently, the user may carry the portable device 120 in a pocket or a bag, or otherwise insert the key with transponder into the key switch without carrying the portable device 120 to steer the motorcycle 1.

While the step for certifying the user ID code is carried out in the meter circuit module 110 and then in the FI circuit module 109, the step may be carried out in a reverse order, or otherwise at the same time.

The step for certifying the user ID code may be performed in components such as a car navigation system and an audio system configured to have a theft prevention function, in addition to the lock circuit module 111, the meter circuit module 110, and the FI circuit module 109. In those cases, the theft prevention function is further enhanced.

Hereinbelow, a function of the theft prevention apparatus for the case where the engine stops will be described.

The theft prevention apparatus is configured such that the rider operates the hand-operated switch 107 for a long time to stop the engine, or otherwise to cancel a control operation being executed to enable the engine to start-up, thus returning to an initial state.

Upon the long-time operation of the hand-operated switch 107, the controller 104 executes the determination process in the steps S2 to S5 to determine whether or not the rider carries the predetermined portable device 120, and causes the display device 118, the FI lamp 112 and the like, to warn the rider that, if the rider should try to stop the engine without carrying the portable device 120, the engine could not be re-started back up. In this state, if the hand-operated switch 107 is re-operated for a long time, that is, the second long-time operation is performed, then the relays 108 and 115 are turned OFF, and the FI circuit module 109, the meter circuit module 110, and the lock circuit module 111 are turned to OFF-states. In addition, the relay 113 is turned OFF. Thereby, the engine stops and is configured to be unable to re-start up. Since the rider must operate the hand-operated switch 107 for a long time twice to stop the engine, and the display device 118 and the FI lamp 112 display the above mentioned information to be presented to the rider during this engine stop process. The rider is inhibited from unintentionally performing an engine stop operation. The motorcycle 101 may be configured in such a manner that the rider must perform the long-time operation three times or more to stop the engine, instead of twice.

In accordance with the theft prevention apparatus configured as described above, since the lock circuit module 111, the meter circuit module 110, and the FI circuit module 109, as well as the controller 104, are configured to perform the step for certifying the user ID code, the theft of the motorcycle 101 is effectively prevented. Any theft attempt will be unsuccessful unless all boards of these circuit modules have been changed. Thus, the theft prevention function is enhanced. In addition, the rider is able to start-up the engine easily with the portable device 20 in the pocket. Furthermore, the stop of the engine can be effectively inhibited even if the portable device 120 is lost.

As in the theft prevention apparatus of the second embodiment, since only a minimum electric power is necessary to keep "sleep mode" of the controller 104 before the hand-operated switch 107 is operated, and hence the electric power is not substantially consumed on the motorcycle 101 side, wasteful power consumption is inhibited. In addition, since the portable device 120 of the theft prevention apparatus also maintains the sleep mode and consumes minute electric power before the in-vehicle apparatus A2 transmits a request signal for transmitting the transmitter detection signal to the portable device 120, wasteful power consumption is inhibited. It shall be understood that the portable device 120 transitions from the active state to the sleep state as soon as the theft prevention function is turned on.

The engine control unit (ECU) of the motorcycle 101, or otherwise, another controller may function as the controller 104 of the second embodiment. Nonetheless, the ECU is desirably employed as the controller 104, without an increase in the number of components and an increase in a manufacturing cost.

The hand-operated switch 107 may be other suitable switches, for example, a pull-in switch or the like positioned around a meter or gauge in the vicinity of the steering head of the handle.

The present invention is applicable to leisure vehicles such as motorcycles, all terrain vehicles, or personal watercraft (PWC) which are equipped with rider's seats which are open to the outside.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A theft prevention apparatus of a leisure vehicle that is configured to enable the leisure vehicle to be steered when a user identification code transmitted by radio matches a correct user identification code, the apparatus comprising:
   a portable device configured to transmit the user identification code by radio;
   a communication device that is equipped in the leisure vehicle and is configured to receive the user identification code transmitted from the portable device, with electric power being supplied to the communication device;
   an electric power, supply loaded in the leisure vehicle;
   a controller including a memory configured to store the correct user identification code, the controller being coupled to the communication device through a signal line and to the electric power supply through a power line and being configured to determine whether or not the user identification code received from the communication device through the signal line matches the correct user identification code stored in the memory and to enable the leisure vehicle to be steered when it is determined that the received user identification code matches the correct user identification code;

a hand-operated switch that is disposed on the power line coupling the electric power supply to the controller and is configured to be turned to an on-state or an off-state to control whether the electric power is supplied from the electric power supply to the controller; and wherein the controller is operated when the hand-operated switch is turned to the on-state.

2. The theft prevention apparatus according to claim 1, wherein the communication device is configured to transmit a request signal to the portable device to request the portable device to transmit a portable device detection signal to the communication device, when the hand-operated switch is tuned to the ON-state; and wherein the portable device is configured to transition from a sleep state to an active state, upon receiving the request signal, and to transmit the user identification code to the communication device.

3. The theft prevention apparatus according to claim 2, further comprising:

a theft prevention module that is configured to have a theft prevention function and includes a lock module of the leisure vehicle;

wherein the controller determines whether or not the user identification code transmitted from the portable device and received in the communication device matches the correct user identification code stored in the memory of the controller, and causes the lock module to turn to an on-state to unlock at least a steering lock when it is determined that the received user identification code matches the correct user identification code.

4. The theft prevention apparatus according to claim 3, wherein the theft prevention module further includes a fuel and ignition module of the leisure vehicle; and the controller determines whether or not the user identification code transmitted from the portable device and received in the communication device matches the correct user identification code and causes the fuel and ignition module to be activated to enable an engine to start-up when the received user identification code matches the correct user identification code.

5. The theft prevention apparatus according to claim 3, wherein the lock module includes a user identification code match determiner that is coupled to the controller through a signal line, the user identification code match determiner having a second memory configured to store the correct user identification code;

wherein the communication device is configured to send the user identification code-transmitted from the portable device to the user identification code match determiner of the lock module through the controller after it is determined that the user identification code matches the correct user identification code in the controller, and the user identification match code determiner of the lock module is configured to determine whether or not the user identification code matches the correct user identification code in the second memory; and wherein the user identification code match determiner of the lock module causes the lock module to turn to the on-state to unlock at least the steering lock when the user identification code matches the correct user identification code.

6. The theft prevention apparatus according to claim 4, wherein the fuel and ignition module includes a user identification code match determiner that is coupled to the controller through a signal line and configured to store the correct user identification code;

wherein the communication device is configured to send the user identification code transmitted from the portable device to the user identification code match determiner of the fuel and ignition module through the controller, and the user identification match code determiner of the fuel and ignition module is configured to determine whether or not the user identification code matches the correct user identification code, and wherein the user identification code match determiner of the fuel and ignition module causes the fuel and ignition module to be activated when the user identification code matches the correct user identification code.

7. The theft prevention apparatus according to claim 3, wherein the theft prevention module further includes a meter module of the leisure vehicle, the meter module including a user identification code match determiner that is coupled to the controller through a signal line and configured to store the correct user identification code;

wherein the communication device is configured to send the user identification code transmitted from the portable device to the user identification code match determiner of the meter module through the controller, and the user identification match code determiner of the meter module is configured to determine whether or not the user identification code matches the correct user identification code; and wherein the user identification code match determiner of the meter module causes the meter module to be activated when the user identification code matches the correct user identification code.

8. The theft prevention apparatus according to claim 1, further comprising:

a display device that is equipped in the leisure vehicle and is configured to answer back when the received user identification code matches the correct user identification code.

9. The theft prevention apparatus according to claim 1, wherein the controller is configured to cause an engine to start-up by turning on a starter switch within a predetermined time from a time point when the user identification code received in the communication device matches the correct user identification code; and wherein the controller is configured to return a control process to an initial state in which a theft prevention function is active when a match between the user identification codes is not detected after the time point.

10. The theft prevention apparatus according to claim 1, wherein the portable device is configured to send to the communication device, the user identification code and a battery signal indicating that a battery power of a battery loaded in the portable device is running short, when the battery power is running short;

wherein the communication device is configured to send to the controller the user identification code and the battery signal, upon receiving the user identification code and the battery signal; and wherein the controller is configured to cause the display device equipped in the leisure vehicle to display information indicating that the battery power is running short.

11. A theft prevention apparatus of a leisure vehicle that is configured to enable the leisure vehicle to be steered when a user identification code transmitted by radio matches a correct user identification code, the apparatus comprising:
- a portable device configured to transmit the user identification code by radio;
- a communication device that is equipped in the leisure vehicle and is configured to receive the user identification code transmitted from the portable device, with electric power being supplied to the communication device;
- an electric power supply loaded in the leisure vehicle;
- a controller including a memory configured to store the correct user identification code, the controller being coupled to the communication device through a signal line and to the electric power supply through a power line and being configured to determine whether or not the user identification code received from the communication device through the signal line matches the correct user identification code stored in the memory and to enable the leisure vehicle to be steered when it is determined that the received user identification code matches the correct user identification code;
- a hand-operated switch that is disposed on the power line coupling the electric power supply to the controller and is configured to be turned to an on-state or an off-state to or not to permit the electric power to be supplied from the electric power supply to the controller; and
- right and left directional antennae that are disposed on right and left sides of the leisure vehicle such that a rider's seat is located in a region where predetermined angular ranges of the antennae in which the antennae are able to receive radio wave overlap with each other, the antennae being coupled to the communication device through a communication line and being configured to be able to receive signals from the portable device in a case where the portable device is present within the predetermined angular ranges; and
- a comparator that is equipped in the leisure vehicle and is configured to compare intensities of the signals received from the right and left antennae;
- wherein the controller is configured to determine whether or not the user identification code transmitted from the portable device matches the correct user identification code when a difference between the intensities of the signals received from the right and left antenna is zero, or within a predetermined value.

12. A theft prevention apparatus of a leisure vehicle that is configured to enable the leisure vehicle to be steered when a user identWication code transmitted by radio matches a correct user identification code, the apparatus comprising:
- a portable device configured to transmit the user identification code by radio;
- a communication device that is equipped in the leisure vehicle and is configured to receive the user identification code transmitted from the portable device;
- right and left directional antennae that are disposed on right and left sides of the leisure vehicle such that a rider's seat is located in a region where predetermined angular ranges of the antennae in which the antennae are able to receive radio wave overlap with each other, the antennae being coupled to the communication device through a communication line and being configured to be able to receive the signals from the portable device in a case where the portable device is present within the predetermined angular ranges;
- a comparator that is equipped in the leisure vehicle and is configured to compare intensities of the signals received from the right and left antennae; and
- a controller configured to determine whether or not the user identification code transmitted from the portable device matches the correct user identification code when a difference between the intensities of the signals received from the right and left antenna is zero or within a predetermined value.

13. The theft prevention apparatus according to claim 12, wherein the predetermined angular ranges are about 15 to 40 degrees.

14. A theft prevention apparatus of a leisure vehicle that is configured to enable the leisure vehicle to be steered when a user identification code transmitted by radio matches a correct user identification code, the apparatus comprising:
- a portable device configured to transmit the user identification code by radio;
- a communication device that is equipped in the leisure vehicle and is configured to receive the user identification code transmitted from the portable device, with electric power being supplied to the communication device;
- an electric power supply loaded in the leisure vehicle;
- a controller including a memory configured to store the correct user identification code, the controller being coupled to the communication device through a signal line and to the electric power supply through a power line and being configured to determine whether or not the user identification code received from the communication device through the signal line matches the correct user identification code stored in the memory and to enable the leisure vehicle to be steered when it is determined that the received user identification code matches the correct user identification code;
- a hand-operated switch that is disposed on the power line coupling the electric power supply to the controller and is configured to be turned to an on-state or an off-state to or not to permit the electric power to be supplied from the electric power supply to the controller; and
- wherein the communication device is configured to transmit a request signal to the portable device to request the portable device to transmit a portable device detection signal to the communication device, when the hand-operated switch is tuned to the ON-state; and
- wherein the portable device is configured to transition from a sleep state to an active state, upon receiving the request signal, and to transmit the user identification code to the communication device.

15. The theft prevention apparatus according to claim 14, further comprising:
- a theft prevention module that is configured to have a theft prevention function and includes a lock module of the leisure vehicle;
- wherein the controller determines whether or not the user identification code transmitted from the portable device and received in the communication device matches the correct user identification code stored in the memory of the controller, and causes the lock module to turn to an on-state to unlock at least a steering lock when it is determined that the received user identification code matches the correct user identification code.

16. The theft prevention apparatus according to claim 14, wherein the lock module includes a user identification code match determiner that is coupled to the controller through a signal line, the user identification code match determiner having a second memory configured to store the correct user identification code;
- wherein the communication device is configured to send the user identification code transmitted from the portable device to the user identification code match determiner of the lock module through the controller after it is determined that the user identification code matches the correct user identification code in the controller, and the user identification match code determiner of the lock module is configured to determine whether or not the user identification code matches the correct user identification code in the second memory; and wherein the user identification code match determiner of the lock module causes the lock module to turn to the on-state to unlock at least the steering lock when the user identification code matches the correct user identification code.

17. The theft prevention apparatus according to claim 14, further comprising:

a display device that is equipped in the leisure vehicle and is configured to answer back when the received user identification code matches the correct user identification code.

18. A theft prevention apparatus of a leisure vehicle that is configured to enable the leisure vehicle to be steered when a user identification code transmitted by radio matches a correct user code, the apparatus comprising:

a portable device configured to transmit the user identification code by radio;

a communication, device that is equipped in the leisure vehicle and is configured to receive the user identification code transmitted from the portable device, with electric power being supplied to the communication device;

an electric power supply loaded in the leisure vehicle;

a controller including a memory configured to store the correct user identification code, the controller being coupled to the communication device through a signal line and to the electric power supply through a power line and being configured to determine whether or not the user identification code received from the communication device through the signal line matches the correct user identification code stored in the memory and to enable the leisure vehicle to be steered when it is determined that the received user identification code matches the correct user identification code;

a hand-operated switch that is disposed on power line coupling the electric power supply to the controller and is configured to be turned to an on-state or an off-state to or not to permit the electric power to be supplied from the electric power supply to the controller; and wherein the communication device is configured to transmit a request signal to the portable device to request the portable device to transmit a portable device detection signal to the communication device, when the hand-operated switch is tuned to the ON-state; and wherein the portable device is configured to transition from a sleep state to an active state, upon receiving the request signal, and to transmit the user identification code to the communication device;

a theft prevention module that is configured to have a theft prevention function and includes a lock module of the leisure vehicle;

wherein the controller determines whether or not the user identification code transmitted from the portable device and received in the communication device matches the correct user identification code stored in the memory of the controller, and causes the lock module to turn to an on-state to unlock at least a steering lock when it is determined that the received user identification code matches the correct user identification code;

the theft prevention module further includes a fuel and ignition module of the leisure vehicle; and the controller determines whether or not the user identification code transmitted from the portable device and received in the communication device matches the correct user identification code and causes the fuel and ignition module to be activated to enable an engine to start-up when the received user identification code matches the correct user identification code.

19. A theft prevention apparatus of a leisure vehicle that is configured to enable the leisure vehicle to be steered when a user identification code transmitted by radio matches a correct user identification code, the apparatus comprising:

a portable device configured to transmit the user identification code by radio;

a communication device that is equipped in the leisure vehicle and is configured to receive the user identification code transmitted from the portable device, with electric power being supplied to the communication device;

an electric power supply loaded in the leisure vehicle;

a controller including a memory configured to store the correct user identification code, the controller being coupled to the communication device through a signal line and to the electric power supply through a power line and being configured to determine whether or not the user identification code received from the communication device through the signal line matches the correct user identification code stored in the memory and to enable the leisure vehicle to be steered when it is determined that the received user identification code matches the correct user identification code;

a hand-operated switch that is disposed on the power line coupling the electric power supply to the controller and is configured to be turned to an on-state or an off-state to or not to permit the electric power to be supplied from the electric power supply to the controller; and wherein the controller is configured to cause an engine to start-up by turning on a starter switch within a predetermined time from a time point when the user identification code received in the communication device matches the correct user identification code; and wherein the controller is configured to return a control process to an initial state in which a theft prevention function is active when a match between the user identification codes is not detected after the time point.

* * * * *